(12) United States Patent
Pennaz (10) Patent No.: US 8,646,203 B2
(45) Date of Patent: Feb. 11, 2014

(54) FISHING LURE

(76) Inventor: Steven P. Pennaz, Maple Plain, MN (US)

( * ) Notice: Subject to any disclaimer, the term of this patent is extended or adjusted under 35 U.S.C. 154(b) by 468 days.

(21) Appl. No.: 13/092,712

(22) Filed: Apr. 22, 2011

(65) Prior Publication Data

US 2011/0258905 A1 Oct. 27, 2011

Related U.S. Application Data

(60) Provisional application No. 61/327,358, filed on Apr. 23, 2010.

(51) Int. Cl.
*A01K 85/00* (2006.01)

(52) U.S. Cl.
USPC .................................... 43/42.02; 43/42.15

(58) Field of Classification Search
USPC ............ 43/42.02, 42.03, 42.06, 42.15, 42.42, 43/42.47, 42.51; D22/132
See application file for complete search history.

(56) References Cited

U.S. PATENT DOCUMENTS

| | | | | |
|---|---|---|---|---|
| 1,581,833 | A * | 4/1926 | Bonnett | 43/42.15 |
| 1,999,522 | A * | 4/1935 | Van Houten | 43/42.06 |
| 2,233,684 | A * | 3/1941 | Strite | 43/42.15 |
| 2,238,832 | A * | 4/1941 | Thoren | 43/42.15 |
| 2,948,982 | A * | 8/1960 | Galpin | 43/42.15 |
| 4,567,685 | A * | 2/1986 | Duncan | 43/42.15 |
| 4,654,995 | A | 4/1987 | Rapelje | |
| 4,959,920 | A | 10/1990 | Walker | |
| 5,406,738 | A * | 4/1995 | Holleman, Sr. | 43/42.15 |
| 5,560,143 | A | 10/1996 | Allen | |
| 2004/0216358 | A1 | 11/2004 | Brandt | |
| 2011/0239521 | A1 * | 10/2011 | Tsai | 43/42.15 |

FOREIGN PATENT DOCUMENTS

| | | |
|---|---|---|
| JP | 2003-169568 | 6/2003 |
| JP | 2007-053956 | 3/2007 |
| KR | 20-0166747 | 2/2000 |

OTHER PUBLICATIONS

International Search Report and Written Opinion for International application No. PCT/US2011/033603, mailed Jan. 19, 2012, 9 pages.
MF Tackle, Mega Fishing Thailand—Tackle: Jointed Popper lure by Siam spoon, accessed on Apr. 5, 2011, 5 pages.
Jigwobbler Products, accessed on Apr. 5, 2011, 2 pages.
Fishing by me, Crankbaits, accessed on Apr. 5, 2011, 3 pages.
SurfTalk, Sunday plugs, accessed on Apr. 5, 2011, 11 pages.
River2Sea jointed crankbait, V-Crank, accessed on Apr. 5, 2011, 2 pages.

* cited by examiner

*Primary Examiner* — Kimberly Berona
(74) *Attorney, Agent, or Firm* — Merchant & Gould P.C.

(57) ABSTRACT

A multi-action fishing lure includes a buoyant head section, a tail section, a joint, and a lip. The head section includes a front surface and an opposing rear surface. The tail section includes a lip that protrudes from a forward region of the tail section. The front surface includes a recessed region, and also includes a line connection device extending from the recessed region. A joint flexibly couples the head section to the tail section. The fishing lure can be retrieved to generate multiple different actions.

16 Claims, 9 Drawing Sheets

FISHING LURE

CROSS-REFERENCE TO RELATED APPLICATION

This application claims priority to U.S. Provisional Application Ser. No. 61/327,358, filed on Apr. 23, 2010, titled FISHING LURE, the entire disclosure of which is hereby incorporated by reference in its entirety.

TECHNICAL FIELD

The present disclosure relates generally to artificial fishing lures and, more particularly, to a multi-action fishing lure.

BACKGROUND

Artificial fishing lures are commonly used to attract the interest of game fish. A wide variety of artificial fishing lures have been designed. Some common categories of lures include plugs, spinnerbaits, topwater baits, jigs, and jerk baits. Each of these baits is designed with a different type of action. For example, plugs (also known as crankbaits) often have the general shape of a bait fish, and are designed to swim under the water when retrieved. Spinnerbaits include a blade that spins during the retrieve. Topwater baits come in a variety of configurations and are designed to float on the surface of the water. Jigs typically include weighted heads that causes the baits to sink in the water, and are particularly suited for fishing at or near the bottom of a body of water. Jerk baits are designed to be retrieved with a series of tugs and pauses. While many different types of lures have been designed, the lures have limitations in the type of actions that can be achieved. Improvements are desired.

DETAILED DESCRIPTION

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Figure 1:
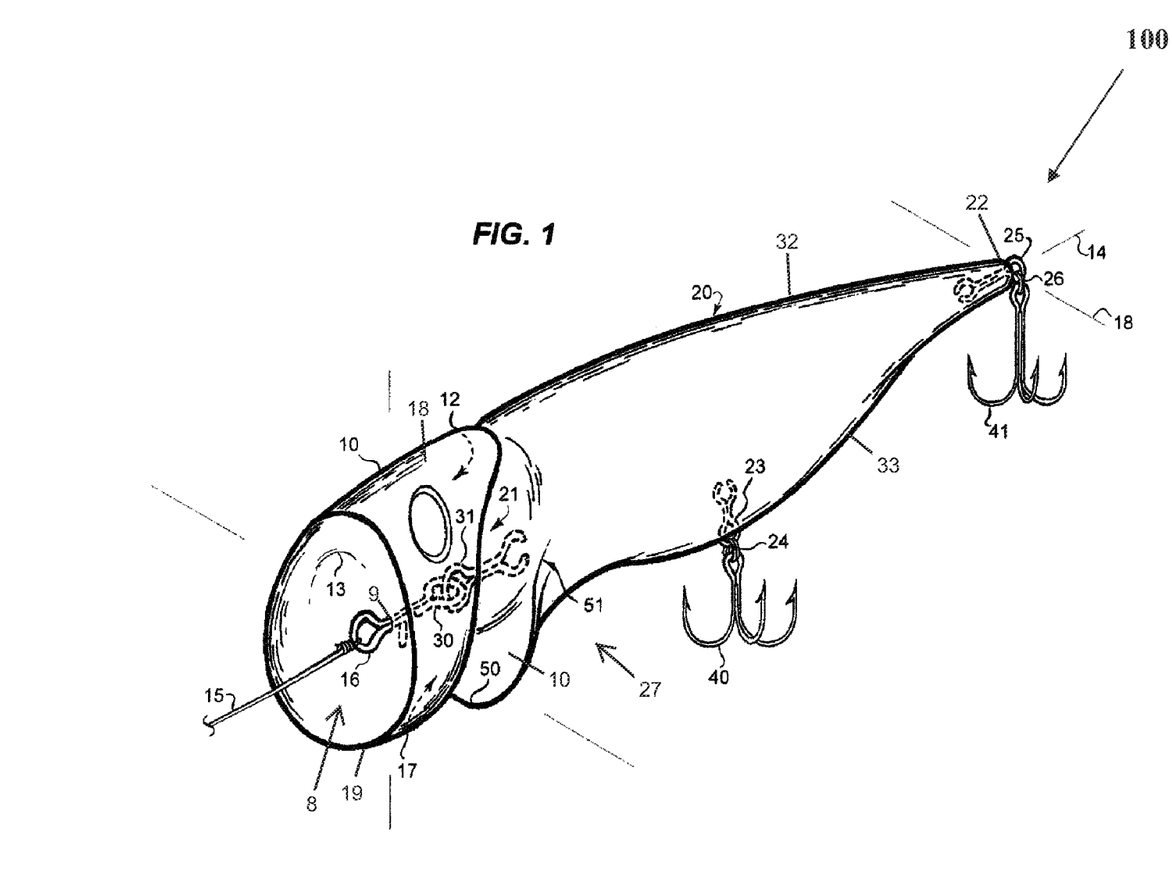
FIG. 1 is a perspective view of an example multi-action fishing lure.
Figure 2:
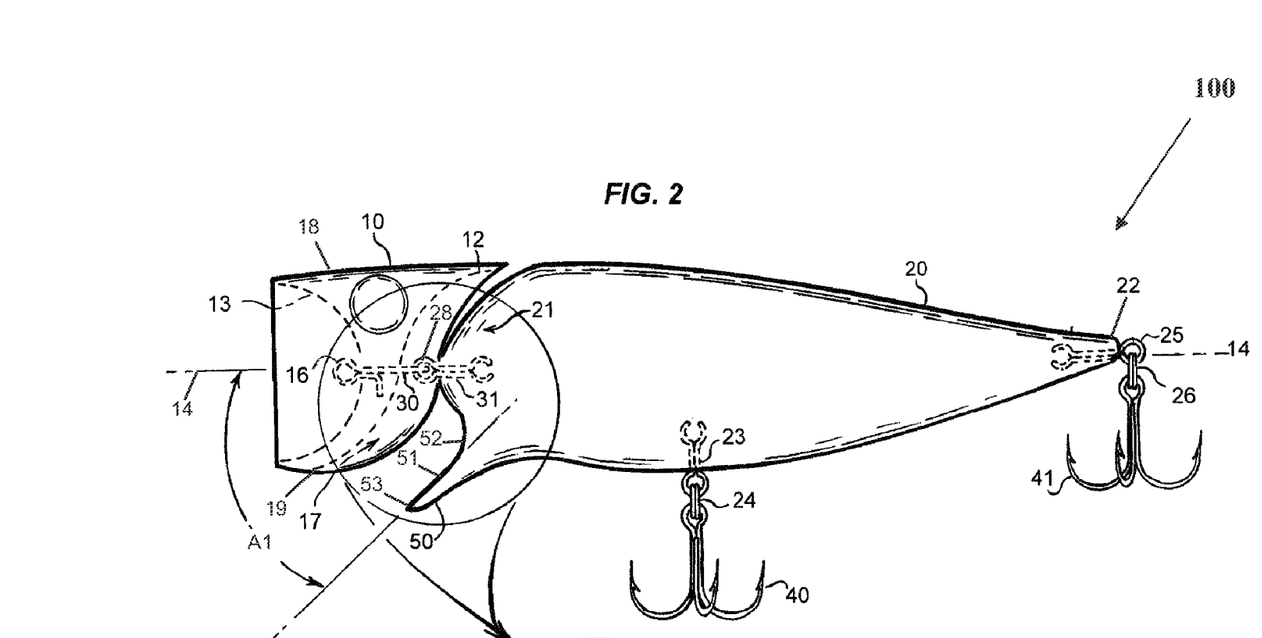
FIG. 2 is a left side view of the lure shown in FIG. 1.
Figure 3:
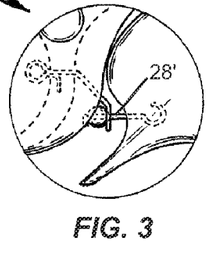
FIG. 3 is a left side view illustrating an alternative joint for the lure shown in FIG. 1.
Figure 4:
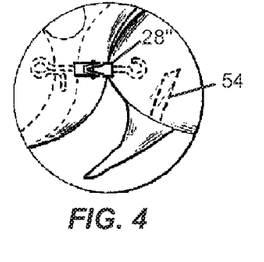
FIG. 4 is a left side view illustrating another alternative joint for the lure shown in FIG. 1.
Figure 5:
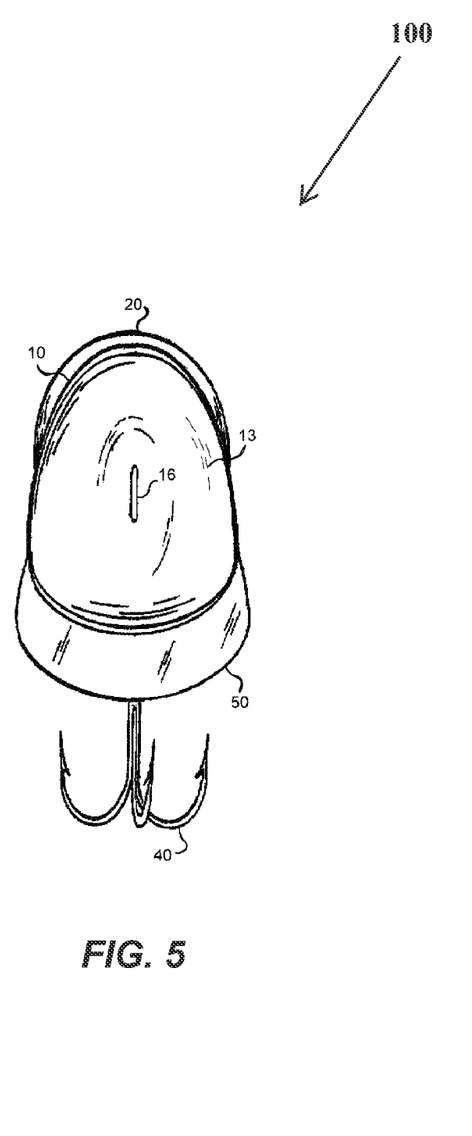
FIG. 5 is a front view of the lure shown in FIG. 1.
Figure 6:
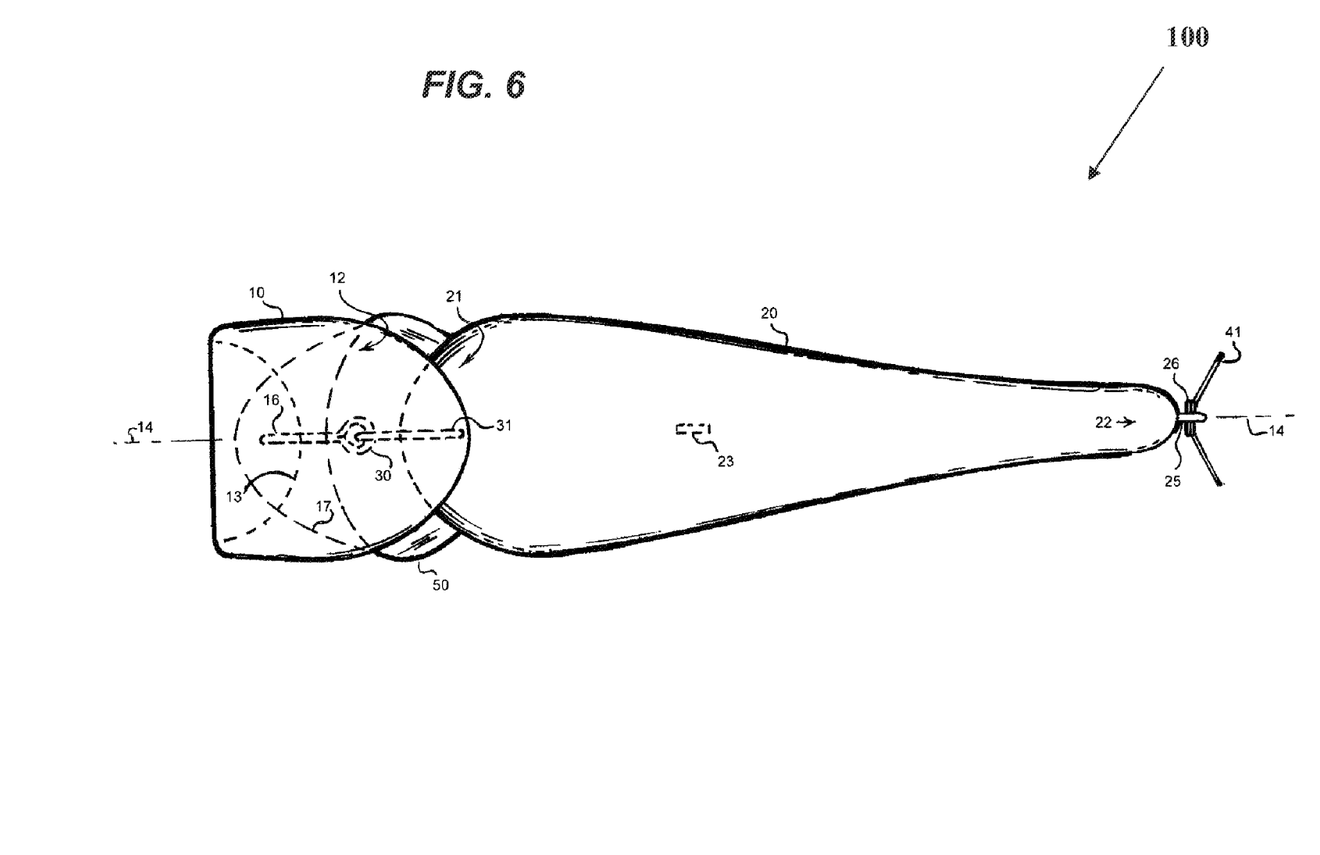
FIG. 6 is a top view of the lure shown in FIG. 1.

FIGS. 1-6 illustrate an example of fishing lure 100 according to the present disclosure. FIG. 1 is a perspective view, FIGS. 2-4 are left side views, FIG. 5 is a front view, and FIG. 6 is a top view.

In the example shown in FIG. 1, fishing lure 100 includes head section 10 and tail section 20 coupled together with a joint 28. Head section 10 includes rear surface 12, front surface 13, and line connection device 16.

Tail section 20 includes front surface 21, rear end 22, upper edge 32, lower edge 33, and hook connection devices 23 and 25. Tail section 20 further includes a forward region 27 that includes and is adjacent to the front surface 21. Tail section 20 also includes lip 50 that extends from the forward region 27 of the tail section 20.

In the example embodiment shown in FIGS. 1-3, joint 28 includes eyelet members 30 and 31. Some embodiments further include additional joint components, such as one or more split rings, a swivel, or another fastener.

Some embodiments further include hooks 40 and 41 connected to the hook connection devices 23 and 25. The fishing lure 100 can include one or more hook connection devices 23 and 25. In one example, the hook connection device 23 extends from the lower edge 33 of the tail section 20, and the hook connection device 25 extends from the rear end 22 of the tail section 20. Examples of hook connection members are eyelets. The connection between hook connection devices 23 and 25 and hooks may include additional coupling devices, such as split rings 24 and 26. In some embodiments, head section 10, joint 28, and tail section 20 extend along a longitudinal axis 14.

Head section 10 is forward of the tail section 20. Head section 10 is coupled to tail section 20 by joint 28 to permit head section 10 and tail section 20 to pivot with respect to each other about joint 28.

Head and tail sections 10 and 20 are typically made of a buoyant material, such as wood or plastic. An example of a suitable wood is balsa wood. An example of a plastic is a moldable polymer. It is preferred that the material have some buoyancy so that lure 100 floats when at rest on a water surface.

Head section 10 includes a concave front surface 13, a rear surface 12, an upper edge 18, and a lower edge 19. Concave front surface 13 is configured to catch the water when the lure is given a sharp jerk to provide a "popping" action. Accordingly, the front surface 13 forms a front popper surface. The front surface 13 includes a recessed region 8, wherein the apex 9 of the concave surface is the most recessed point of the front surface 13. A fishing line connection device 16, such as an eyelet, is secured to concave front surface 13 in some embodiments to provide a location for securing a fishing line to lure 100. Head section 10 is typically free of hook connection devices, and instead, hook connection devices are provided on tail section 20.

In some embodiments, head section 10 further includes an eye portion 11. The eye portion 11 is slightly recessed (or, alternatively, slightly protrudes) from the adjacent surfaces of head section 10 in some embodiments. The eye portion 11 can be painted or an adhesive material can be applied to the eye region to increase visibility of the eye, which can help to draw attention to lure 100. In some embodiments the eye region is painted onto a surface of head section 10.

In some embodiments, rear surface 12 extends between upper and lower edges 18 and 19 of the head section 10, and slopes rearward from the lower edge 19 to the upper edge 18.

In some embodiments, at least a portion of the recessed rear surface forms a channel 17 that directs water toward the lip when the lure is being retrieved.

In some embodiments, the rear surface 12 is recessed and defines a fluid channel 17. In some embodiments, the fluid channel is longitudinally aligned with the lip 50, such that when the lure is retrieved through the water, some of the water is directed through the channel and toward the lip. In this way, the channel improves the action of the tail, by increasing the amount of water interacting with lip 50. In addition, the channel permits the lower edge 19 of the head to be lower, which provides at least a partial barrier to deflect objects in the water (such as weeds, sticks, or other debris) from the path of the lip 50. This reduces the chance that objects will get caught on the lip. The lip 50 includes a proximal end 52 and a distal end 53. In some embodiments the distal end 53 of lip 50 extends lower than the lower edge 19 of the head section 10. In other embodiments, the lower edge 19 is substantially aligned with the distal end 53 of the lip.

With at least some retrieves, lure 100 can be retrieved such that the head remains generally stationary without significant side-to-side motion. Joint 28, however, permits tail section 20 to pivot relative to head section 10, such as to have a side-to-side wobble independent of head section 10. This side-to-side wobble can help to attract attention to lure 100.

Joint 28 is provided between head section 10 and tail section 20 to permit the sections to pivot with respect to each other. In this example, joint 28 includes eyelet members 30 and 31. Eyelet member 30 is anchored to head section at rear end 22. Eyelet member 31 is anchored to tail section 20 through front surface 21. Various alternative joint configurations are used in other embodiments. Several examples are shown in FIGS. 3 and 4. FIG. 3 depicts an example ball joint 28' configuration. The ball joint 28' configuration is an example of an offset joint, where the point where the joint 28' connects to front surface 21 of tail portion is offset from (e.g., lower than) the point where the joint 28' connects to rear surface 12. FIG. 4 depicts an example universal joint 28" configuration. The universal joint 28" configuration is an example of a linear joint, which permits pivoting movement of the tail section 20 in all directions relative to the head section 10, including side to side, and up and down. FIG. 4 also illustrates an example of an inserted lip 28" that is formed as a separate piece from the tail section 20.

Tail section 20 includes lip 50 extending downward and forward of a lower portion of front surface 21. In some embodiments lip 50 includes a generally planar forward-facing surface 51 extending between proximal end 52 and distal end 53 of lip 50. The surface 51 is arranged at a diving angle A1 (FIG. 2) relative to a longitudinal axis 14 of the tail section 20. In some embodiments, the diving angle A1 is in a range from about 35 degrees to about 55 degrees from the longitudinal axis 14. In another embodiment, the diving angle A1 is about 45 degrees. During a steady retrieve, for example, lip 50 interacts with the water—causing lure 100 to be pulled downward, and causing tail section 20 to wobble back and forth.

As shown in FIG. 2, some embodiments of lure 100 includes tail section 20 having an integrally molded lip 50 extending therefrom. In some embodiments, the lip 50 and tail section 20 are formed as a single piece. In another possible embodiment, however, lip 50 is formed separate from tail section 20. For example, as shown in FIG. 4, some embodiments of tail section 20 include a groove 54 formed therein. A matching protrusion is formed in lip 50 that can be inserted into groove 54 and secured in position, such as with adhesive or other fastener.

Some embodiments have a tail section 20 with a body shape in which at least a portion of the tail section tapers in size toward the rear end, as shown in FIG. 2. For example, the section of tail section 20 rearward of the hook connection device 23 has a lateral cross-sectional area that decreases toward the rear end, such that the lateral cross-sectional area of the tail section 20 is greater than the lateral cross-sectional area of the tail section 20 adjacent rear end 22.

In some embodiments, lure 100 includes a joint that is near to the front end of lure 100. In some embodiments, the distance between the most forward point of lure 100 and the center of the joint is in a range from about ⅕ to about ⅙ the total length of lure 100. However, other embodiments include other configurations. In another example embodiment, a ratio of a length of the tail section to a length of the head section is in a range from about 1:1 to about 5:1. For example, some embodiments include shortened tail sections, such as to form a bait having a shorter overall length.

FIGS. 7-11 illustrate the operation of lure 100 using various types of retrieves.

Figure 7:
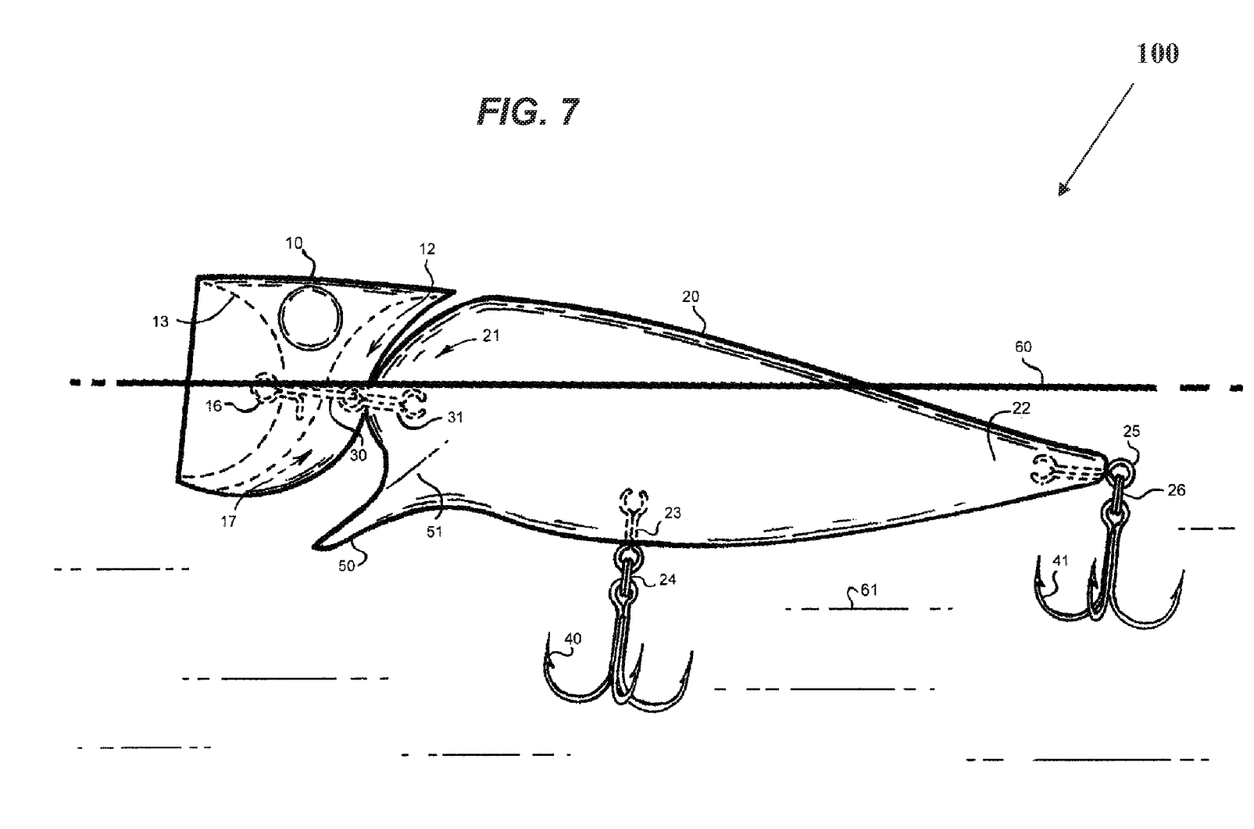
FIG. 7 is a left side view of the lure shown in FIG. 1, shown at rest on the surface of the water.

FIG. 7 illustrates lure 100 when at rest on a surface of water 61. When in this position, lure 100 is preferably buoyant, such that lure 100 floats partially above the surface of water 61 and partially below the surface of water 61. In some embodiments, tail section 20 rests at an angle, such that rear end 22 of lure 100 is angled downward relative to the surface of water 61.

Figure 8:
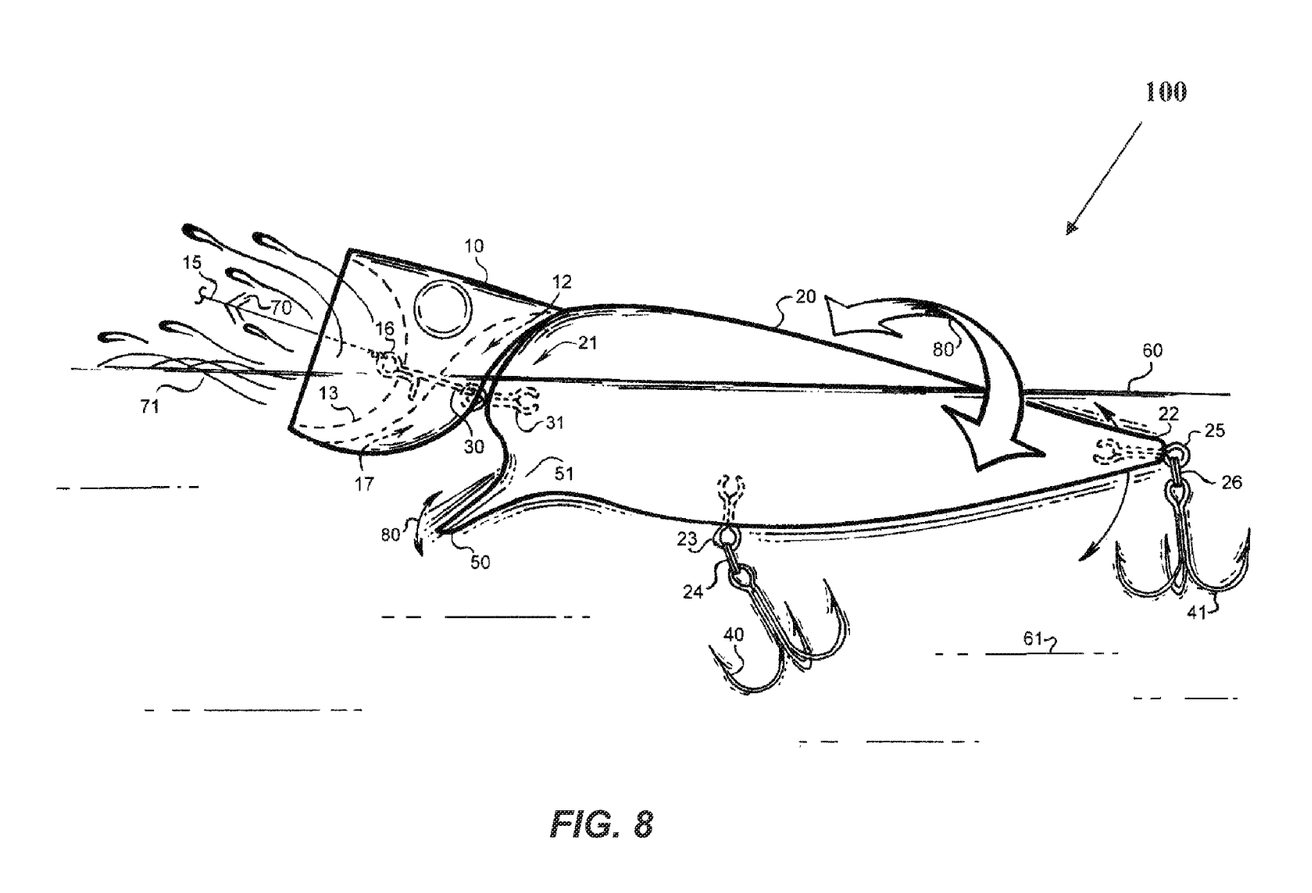
FIG. 8 is a left side elevational view of the lure shown in FIG. 1 while using a surface popping retrieve.

FIG. 8 illustrates a surface popping action of lure 100. The surface popping action is imparted on lure 100 by pulling lure 100 with fishing line 15 with a short and quick snapping action. The force pulls lure 100 forward suddenly, causing front surface 13 of head section 10 to scoop and throw some of water 61. A "popping" sound is also generated in some embodiments that can further help to attract fish to lure 100.

In some embodiments, during a surface popping action of lure 100, tail section 20 will move with a side-to-side swimming action in which the lure rolls back and forth in the direction of arrow 80.

Figure 9:
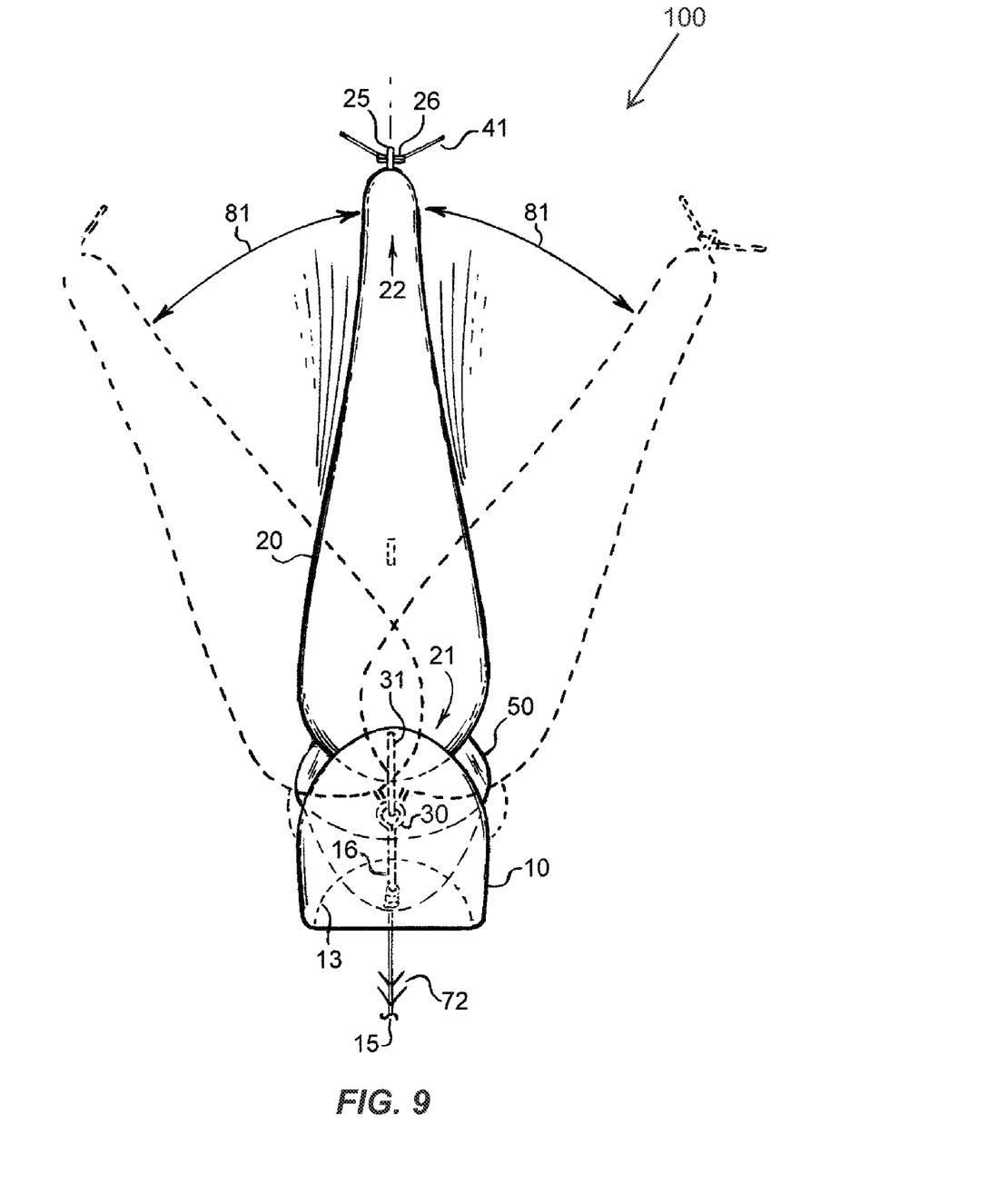
FIG. 9 is a top plan view of the lure shown in FIG. 1 while using a sub-surface walking retrieve.

FIG. 9 illustrates the operation of lure 100 during another exemplary retrieve, in which the lure moves in a zigzag type motion. This is alternatively referred to as a "walking" action. The walking action is imparted on lure 100 by applying short snapping forces to lure 100 with fishing line 15 in the direction of arrow 72. A short pause between tugs allows lure 100 to briefly glide through the water, after which another snapping force is applied to lure 100. Tail section 20 can then be caused to move side-to-side as illustrated in FIG. 9. For example, after a first force, tail section 20 will glide in a first angled position. The second force then causes tail section 20 to move to the second position (in the direction of arrows 81) and glide in the second direction. Continued snapping results in a zigzag type motion. When pulled, lip 50 causes lure 100 to dive. If the subsequent pulls on lure 100 are provided before lure 100 floats back up to the surface, a sub-surface retrieve can be obtained. Alternatively, lure 100 can be allowed to return to the surface after each pull.

Figure 10:
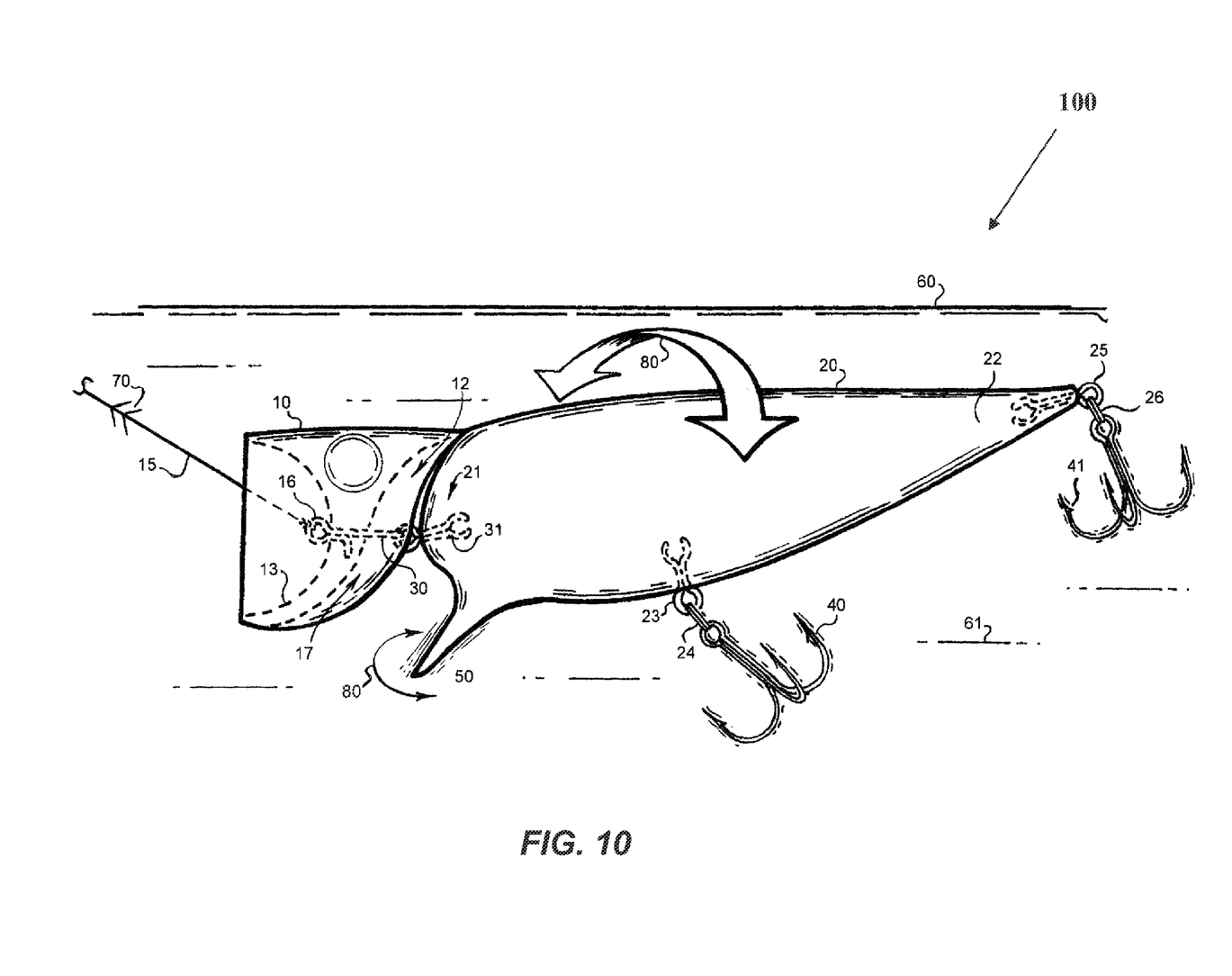
FIG. 10 is a left side view of the lure shown in FIG. 1 while using a steady sub-surface retrieve.

FIG. 10 illustrates the operation of lure 100 during a steady retrieve. In this example, a steady force is applied to lure 100 by line 15 in the direction of arrow 70. Lip 50 interacts with water 61 to pull lure 100 downward, while also generating a side-to-side motion in the direction of arrow 80. The motion of lip 50 is transferred through tail section, causing the entire tail-section to wiggle in the side-to-side direction of arrow 80. The joint of lure 100 allows head section 10 to remain substantially stationary and forward-facing relative to tail section 20 during a steady retrieve. A medium to high retrieve speed will maintain lure 100 under the surface of the water. This motion mimics a live baitfish.

Figure 11:
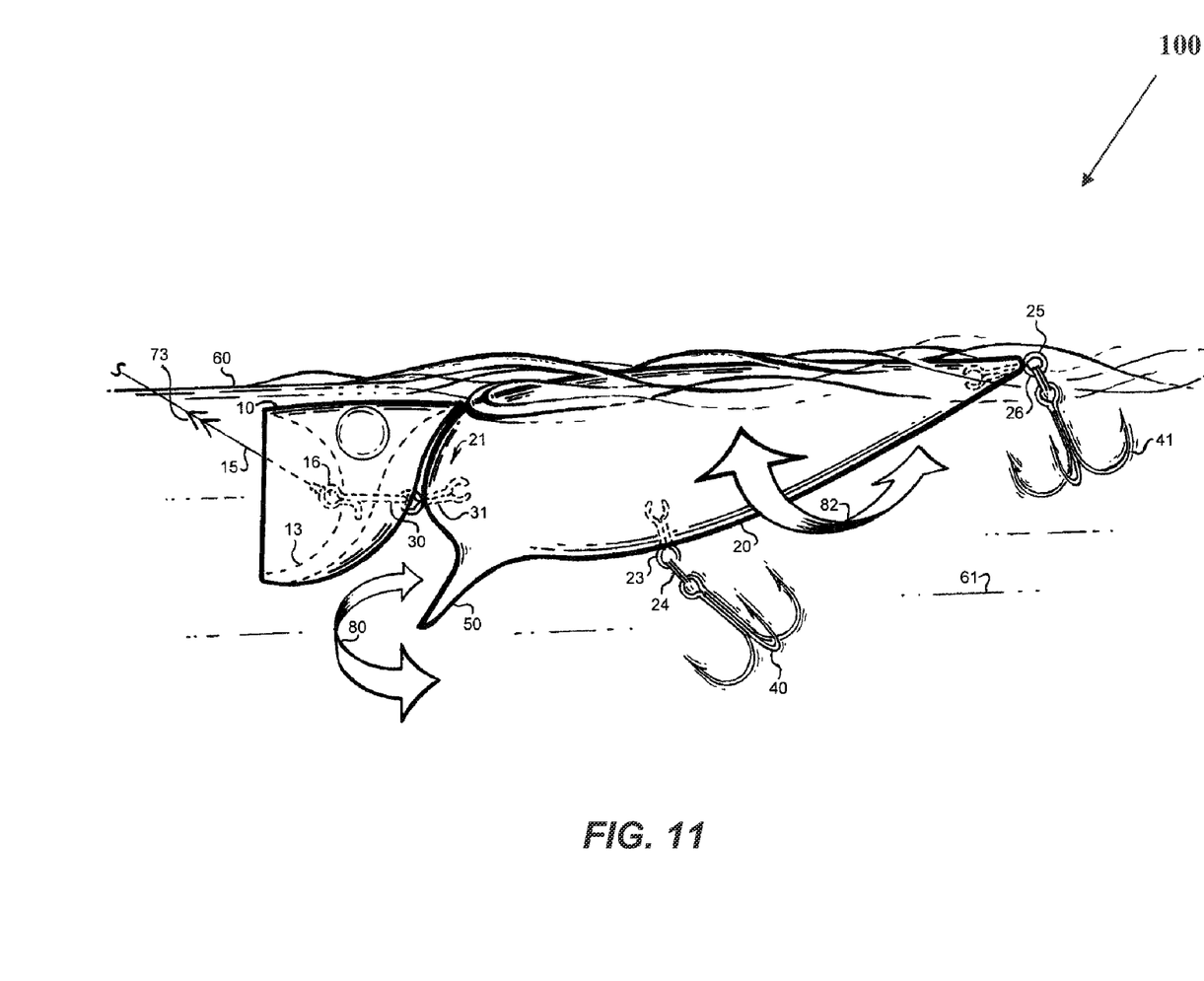
FIG. 11 is a left side elevational view of the lure shown in FIG. 1 while using a slow retrieve causing a surface disturbance.

FIG. 11 illustrates the operation of lure 100 during a slow and steady retrieve. In this example, a steady force is applied to lure 100 by line 15 in the direction of arrow 70, but the speed of the retrieve is relatively slow. As a result, the interaction between the water and lip 50 does not generate a downward force that is sufficient to pull lure 100 completely significantly under the water. Instead, lure 100 remains at or just below the surface 60 of water 61. Lip 50 creates a side-to-side motion as shown by arrow 80. The side-to-side motion causes tail section 20 to move back and forth in the direction of arrow 82. The movement of tail section 20 causes a disturbance to the surface of the water that ripples out from lure 100. This surface disturbance is noticeable by fish and can help to bring attention to lure 100.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A fishing lure comprising:
   a buoyant head section including a front surface and an opposing rear surface, the front surface including a recessed region and a line connection device extending from the recessed region;
   a buoyant tail section including a forward region;
   a joint flexibly coupling the rear surface of the head section to the forward region of the tail section; and
   a lip protruding from the forward region of the tail section;
   wherein the rear surface of the head section includes a fluid channel longitudinally aligned with the lip wherein when the lure is retrieved through water, some of the water is directed through the channel and toward the lip.

2. The fishing lure of claim 1, wherein the lip connects to the tail section at a proximal end and includes an opposing distal end, and wherein the head section includes a lower edge substantially aligned with the distal end of the lip, wherein the arrangement of the head section provides at least a partial barrier to deflect objects from a path of the lip when the fishing lure is retrieved through the water.

3. The fishing lure of claim 1, wherein the lip includes a forward facing surface between the proximal end and the distal end, the forward facing surface arranged at a diving angle relative a longitudinal axis of the tail section, wherein when the fishing lure is retrieved through a fluid, the lip causes the lure to dive below a surface of the fluid.

4. The fishing lure of claim 3, wherein the diving angle is in a range from about 35 degrees to about 55 degrees from the longitudinal axis of the tail section.

5. The fishing lure of claim 1, wherein the lip and the tail section are formed as a single piece.

6. The fishing lure of claim 1, wherein a ratio of a length of the tail section to a length of the head section is in a range from 1:1 to 5:1.

7. The fishing lure of claim 1, wherein the head includes a recessed eye portion.

8. The fishing lure of claim 1, further comprising one or more hook connection devices coupled to the tail section.

9. The fishing lure of claim 8, further comprising one or more fishing hooks coupled to the one or more hook connection devices.

10. The fishing lure of claim 1, wherein the joint comprises a substantially linear joint.

11. The fishing lure of claim 1, wherein the joint comprises an offset joint.

12. The fishing lure of claim 1, wherein the tail section includes a rear end opposed to the forward region, and wherein at least a portion of the tail section has a lateral cross-sectional area that decreases in a direction toward the rear end.

13. A multi-action fishing lure comprising:
   a head section including a front popper surface and a fishing line connection device extending from the popper surface, wherein the head floats on water and wherein the front popper surface generates a popping action when a sharp tug is applied to the fishing lure at the fishing line connection device;
   a tail section including a protruding lip, wherein the protruding lip generates a diving and a side-to-side wobble action at the tail section when a steady force is applied to the fishing lure at the fishing line connection device; and
   a joint connecting the head section and the tail section that permits the tail section to pivot relative to the head section;
   wherein the head section further comprises a rear surface extending between upper and lower edges of the head, wherein the rear surface is recessed and slopes rearward from the lower edge to the upper edge, and wherein at least a portion of the recessed rear surface forms a channel that directs water toward the lip when the lure is being retrieved.

14. The multi-action fishing lure of claim 13, wherein the front popper surface of the head section is configured to remain substantially forward facing when the protruding lip generates the diving and the side-to-side wobble action at the tail section.

15. A fishing lure comprising:
   a head section having a shape resembling the shape of a head of a fish including a pair of eyes positioned on sides of the head section, the head section including a front surface, an opposing rear surface, and an upper edge and an opposing lower edge that is shorter than the upper edge, wherein the front surface of the head section has a concave shape including an apex, and wherein the rearward surface forms a recessed channel that slopes rearward from the lower edge toward the upper edge;
   a line connection device coupled to the apex of the front surface of the head section;
   an elongate tail section including a front surface, an opposing rear end, a forward region including and adjacent to the front surface, an upper edge, and an opposing lower edge;
   a lip including a proximal end and a distal end protruding from the tail section, wherein the proximal end of the lip is coupled to the lower edge of the forward region of the tail section, wherein the lip has a forward-facing surface arranged at an angle to a longitudinal axis of the tail section, wherein the angle is in a range from about 35 degrees to about 55 degrees, and wherein the rear surface of the head section includes a fluid channel longitudinally aligned with the lip wherein when the lure is retrieved through water, some of the water is directed through the channel and toward the lip;
   a joint coupled to the rear surface of the head section and the forward end of the front surface, wherein the joint flexibly connects the head section and the tail section to permit movement of the tail section relative to the head section; and eyelets coupled to the tail section to connect hooks to the tail section, wherein a first eyelet extends from the lower edge of the tail section, and a second eyelet extends from the rear end of the tail section.

16. The fishing lure of claim 15, wherein the head section is free of hooks and is free of hook connection devices configured to connect hooks to the head section.

* * * * *